United States Patent
Zhao et al.

(10) Patent No.: US 10,581,599 B2
(45) Date of Patent: Mar. 3, 2020

(54) CLOUD STORAGE METHOD AND SYSTEM (71) Applicant: QUANTUMCTEK CO., LTD, Hefei, Anhui (CN)

(72) Inventors: Yong Zhao, Hefei (CN); Meisheng Zhao, Hefei (CN); Hongyu Wu, Hefei (CN)

(73) Assignee: QUANTUMCTEK CO., LTD, Hefei (CN)

( * ) Notice: Subject to any disclaimer, the term of this patent is extended or adjusted under 35 U.S.C. 154(b) by 185 days.

(21) Appl. No.: 15/571,186

(22) PCT Filed: May 5, 2016

(86) PCT No.: PCT/CN2016/081072
§ 371 (c)(1),
(2) Date: Nov. 1, 2017

(87) PCT Pub. No.: WO2016/177332
PCT Pub. Date: Nov. 10, 2016

(65) Prior Publication Data
US 2018/0351734 A1    Dec. 6, 2018

(30) Foreign Application Priority Data
May 5, 2015 (CN) .......................... 2015 1 0225113

(51) Int. Cl.
*H04L 9/08* (2006.01)
*G06N 10/00* (2019.01)
(Continued)

(52) U.S. Cl.
CPC ........ *H04L 9/0852* (2013.01); *G06F 21/6218* (2013.01); *G06N 10/00* (2019.01); *H04L 9/088* (2013.01); *H04L 29/06* (2013.01)

(58) Field of Classification Search
CPC ..................................................... H04L 9/0852
See application file for complete search history.

(56) References Cited

U.S. PATENT DOCUMENTS

| 7,068,790 | B1 * | 6/2006 | Elliott | ................... | H04L 9/0852 |
| | | | | | 380/256 |
| 7,515,716 | B1 * | 4/2009 | Elliott | ................... | H04L 9/0858 |
| | | | | | 380/256 |

(Continued)

FOREIGN PATENT DOCUMENTS

| CN | 101427509 A | 5/2009 |
| CN | 201430596 Y | 3/2010 |

(Continued)

OTHER PUBLICATIONS

Mohammad et al.: "Innovative Method for enhancing Key generation and management in the AES-algorithm;" International Journal of Computer Network and Information Security, vol. 7, No. 4; Mar. 8, 2015, pp. 14-20.

(Continued)

*Primary Examiner* — Bradley W Holder
(74) *Attorney, Agent, or Firm* — Maschoff Brennan (57) ABSTRACT

A cloud storage method and a cloud storage system are provided. The method includes: generating, by a QKD system on a terminal side and a QKD system on at least one cloud server side, at least one quantum key over a quantum network; sending, by the QKD system, the at least one quantum key to the key management terminal for storage; and obtaining, by a cloud storage client, the at least one quantum key from the key management terminal, and processing the at least one quantum key to generate a combined key by a predetermined encryption algorithm.

13 Claims, 4 Drawing Sheets

(51) Int. Cl.
*H04L 29/06* (2006.01)
*G06F 21/62* (2013.01)

(56) References Cited

U.S. PATENT DOCUMENTS

| | | | | |
|---|---|---|---|---|
| 9,077,577 | B1* | 7/2015 | Ashrafi | ............... H04L 27/362 |
| 2014/0331050 | A1* | 11/2014 | Armstrong | ............ H04L 9/0855 |
| | | | | 713/171 |

FOREIGN PATENT DOCUMENTS

| | | |
|---|---|---|
| CN | 103490891 A | 1/2014 |
| CN | 103763099 A | 4/2014 |
| JP | H0435538 A | 2/1992 |
| JP | H09130618 A | 5/1997 |
| JP | 2008520144 A | 6/2008 |
| JP | 2010506542 A | 2/2010 |
| JP | 2013506373 A | 2/2013 |
| JP | 2013513834 A | 4/2013 |
| WO | 2012052079 A1 | 4/2012 |
| WO | 2015/056236 | 4/2015 |

OTHER PUBLICATIONS

Vidya et al.: "Secure Data Access Control for multi-authority Quantum based Cloud storage;" 2015 International Conference on Computing and Communications Technologies (ICCCT); 2015 IEEE; Feb. 26, 2015; pp. 387-391.
European Search Report dated Dec. 3, 2018, issued in EP Application No. 16789326.2; Quantumctek Co., Ltd.; 9 pages.
Mohammad et al., Securing Cloud Computing Environment using a New Trend of Cryptography, Cloud Computing (ICCC), 2015 International Conference. Apr. 29, 2015.
International Search Report and Written opnion dated Jul. 21, 2016 in related PCT Application No. PCT/CN2016/081072.

* cited by examiner

CLOUD STORAGE METHOD AND SYSTEM

The present application is the national phase of International Patent Application No. PCT/CN2016/081072, titled "CLOUD STORAGE METHOD AND SYSTEM", filed on May 5, 2016, which claims priority to Chinese Patent Application No. 201510225113.6, titled "CLOUD STORAGE METHOD AND SYSTEM", filed on May 5, 2015, with the State Intellectual Property Office of the People's Republic of China, both of which are incorporated herein by reference in their entireties.

TECHNICAL FIELD

The present disclosure relates to the technical field of cloud storage, and in particular to a cloud storage method and a cloud storage system.

BACKGROUND

Cloud storage refers to a cloud computing system taking data access and data management as the core. The system has two advantages as follows. In one aspect, the user may access to the cloud storage at any time, from anywhere, through any networkable devices, which is quite convenient to perform data access operation. In the other aspect, the user does not need to invest in a local data center or dedicated remote site to maintain and manage data, and can have a large amount of low-cost storage space by means of cloud storage. Based on the above-mentioned two advantages, the cloud storage technology has been rapidly developed in recent years, and more and more users choose to use cloud storage.

When the user uses the cloud storage, the data is usually encrypted with a key, and then uploaded to the cloud server side. However, it is difficult for the user to achieve the unconditional security of the file encryption, and there is a security risk on the cloud server side and the transmission path. In the conventional technology, the key is usually divided to increase the difficulty to crack the encryption by a malicious attacker, thereby improving the data security. For example, the user divides a key K for data encryption into N component keys based on a mathematical algorithm. The N component keys include one principal component key and N−1 component keys, and the principal component key includes information about the other component keys. Then the user sends the principal component key to the cloud storage client for storage, and sends the other component keys to different cloud storage servers for storage. In a case where the user needs the original key K to decrypt the data, the user obtains the component keys on the cloud storage servers, and may recover the original key K with the component keys in combination with the principal component key.

However, in the method of dividing the key, the principal component key sent to the cloud storage client and the component key sent to the cloud storage server may be easily intercepted by a malicious attacker during transmission. Further, the above-mentioned method is based on the mathematical algorithm, and the progress of mathematics and rapid development of computer technology will give rise to the cracking of the key K for data encryption, and eventually lead to serious data security issues for cloud storage.

SUMMARY

In view of the above, the present disclosure provides a cloud storage method and a cloud storage system to address the issue that, in the method in conventional technology of dividing a key, the principal component key sent to the cloud storage client and the component key sent to the cloud storage server may be easily intercepted by a malicious attacker during transmission. Further, the above-mentioned method is based on the mathematical algorithm, and the progress of mathematics and rapid development of computer technology will give rise to the cracking of the key K for data encryption, and eventually lead to serious data security issues for cloud storage.

In order to achieve the above object, the present disclosure provides the following technical solutions.

A cloud storage method is provided. The method is applied to a terminal side of a cloud storage system, the terminal side includes a cloud storage client, a key management terminal and a quantum key distribution QKD system. The method includes:

generating, by the QKD system and a QKD system on at least one cloud server side, at least one quantum key over a quantum network;

sending, by the QKD system, the at least one quantum key to the key management terminal for storage; and obtaining, by the cloud storage client, the at least one quantum key from the key management terminal, processing the at least one quantum key to generate a combined key by a predetermined encryption algorithm.

Optionally, after obtaining, by the cloud storage client, the at least one quantum key from the key management terminal, and processing the at least one quantum key to generate a combined key by a predetermined encryption algorithm, the method further includes:

encrypting, by the cloud storage client, to-be-stored plaintext data with the combined key, to generate ciphertext data;

sending, by the cloud storage client, the ciphertext data to the cloud server side for storage; and deleting, by the terminal side, the at least one quantum key and the combined key.

Optionally, the method further includes:

sending, by the cloud storage client, to the cloud server side a download request for requesting to download the ciphertext data and the at least one quantum key;

receiving, by the cloud storage client, the ciphertext data and the at least one quantum key fed back by the cloud server side;

processing, by the cloud storage client, the at least one quantum key by a predetermined encryption algorithm, to generate the combined key; and decrypting, by the cloud storage client, the ciphertext data with the combined key.

Optionally, the method further includes:

informing, by the cloud storage client, the cloud server side to delete the at least one quantum key and the ciphertext data.

Optionally, before encrypting, by the cloud storage client, to-be-stored plaintext data with the combined key, to generate ciphertext data, the method further includes:

pre-adding, by the cloud storage client, a data tag for the to-be-stored plaintext data; and sending, by the cloud storage client, the data tag to the at least one cloud server side, such that the at least one cloud server side uses the data tag to identify the at least one quantum key.

Optionally, the downloading, by the cloud storage client, the at least one quantum key from the cloud server side, includes:

sending, by the cloud storage client, the data tag to all cloud server sides; and receiving, by the cloud storage client, the at least one quantum key sent from the cloud server side which uses the data tag to identify the quantum key.

A cloud storage method is provided. The method is applied to a cloud server side of a cloud storage system. The cloud server side includes a cloud storage server which is connected to a key management terminal connected to a quantum key distribution QKD system. The method includes:

generating, by the QKD system and a QKD system on at least one terminal side, at least one quantum key over a quantum network; and sending, by the QKD system, the at least one quantum key to the key management terminal for storage.

Optionally, the method further includes:

storing, by the cloud storage server, ciphertext data after receiving the ciphertext data sent from the terminal side.

Optionally, the method further includes:

feeding back, by the cloud storage server, the ciphertext data and the at least one quantum key to the terminal side, after receiving a download request sent from the terminal side for requesting to download the ciphertext data and the at least one quantum key, wherein the at least one quantum key is encrypted and transmitted through a quantum key shared between the cloud server side and the terminal side other than the at least one quantum key.

A cloud storage system is provided. The system includes at least one terminal side and at least one cloud server side connected to each other via a quantum network and a classical network. The at least one terminal side and the at least one cloud server side are configured to perform the above-mentioned cloud storage method.

It follows from the above-mentioned technical solution that, compared to the conventional technology, the present invention discloses a cloud storage method and a cloud storage system, in which the QKD system on the terminal side and the QKD system on at least one cloud server side generate at least one quantum key over the quantum network, and the cloud storage client processes the at least one quantum key to generate the combined key by the predetermined encryption algorithm. With the above-mentioned method, the quantum key distribution technology and cloud storage technology are combined. By taking advantage of the distributed characteristic of the cloud storage and the natural advantage that a large amount of random number keys can be easily generated by the quantum key distribution technology and are difficult to be intercepted, a malicious attacker cannot obtain the quantum key and thus cannot crack the combined key, which significantly ensures data security of the cloud storage.

BRIEF DESCRIPTION OF THE DRAWINGS

In order to more clearly illustrate technical solutions according to the embodiments of the present disclosure or in the conventional technology, drawings to be used in the description of the embodiments or the conventional technology are briefly described. It is apparent that the drawings in the following description are merely embodiments of the present disclosure, and for the people skilled in the art, other drawings may be obtained in accordance with the provided drawings without creative work.

DETAILED DESCRIPTION OF THE EMBODIMENTS

The technical solutions are described clearly and comprehensively in conjunction with drawings according to embodiments of the present disclosure. Apparently, the described embodiments are merely parts of, not all of, the embodiments of the disclosure. All other embodiments obtained by those of ordinary skill in the art based on the embodiments of the present disclosure without creative work are within the scope of protection of the present disclosure.

The terms such as "first" and "second" in the specification and claims of the present invention and the drawings are to distinguish among similar objects, and are not to describe a particular order or sequence. It should be understood that the terms used in this way are interchangeable where appropriate, and are merely to distinguish among objects of same attributes in the embodiments of the disclosure. In addition, the terms "comprise", "include" and any variations thereof are intended to cover a non-exclusive inclusion, such that a process, method, system, product or device containing a series of elements is not limited to those elements and may contain other units which are not clearly listed but are inherent in the process, method, product, or device.

As can be seen from the background, in the method in the conventional technology which includes dividing the key, the principal component key sent to the cloud storage client and the component key sent to the cloud storage server may be easily intercepted by a malicious attacker during transmission. Further, the above-mentioned method is based on the mathematical algorithm, and the progress of mathematics and rapid development of computer technology will give rise to the cracking of the key K for data encryption, and eventually lead to serious data security issues for cloud storage.

In view of the above, the present disclosure provides a cloud storage method and a cloud storage system. At least one quantum key is generated, over a quantum network, by a QKD system on the terminal side and a QKD system on at least one cloud server side. The cloud storage client processes the at least one quantum key to generate a combined key by a predetermined encryption algorithm. With the above-mentioned method, the quantum key distribution technology and cloud storage technology are combined. By taking advantage of the distributed characteristic of the cloud storage and the natural advantage that a large amount of random number keys can be easily generated by the quantum key distribution technology and are difficult to be intercepted, a malicious attacker cannot obtain the quantum key and thus cannot crack the combined key, which significantly ensures data security of the cloud storage.

The cloud storage method and cloud storage system disclosed in the present disclosure are described in detail with reference to specific embodiments.

First Embodiment

Figure 1:
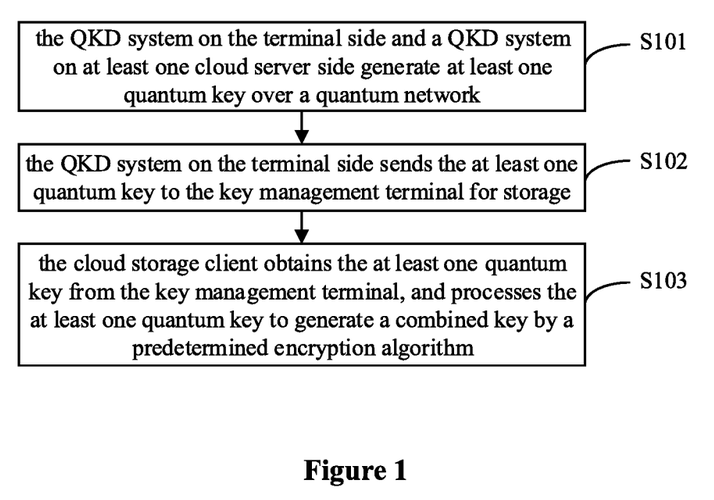
FIG. 1 is a flowchart of a cloud storage method according to a first embodiment of the present disclosure.

FIG. 1 is a flowchart of a cloud storage method according to a first embodiment of the present disclosure. The method is applied to a terminal side of a cloud storage system. The terminal side includes a cloud storage client, a key management terminal and a quantum key distribution (QKD) system. The cloud storage client may be a mobile phone, a computer or other dedicated cloud storage clients, etc. The cloud storage client is connected to a key management terminal, and the key management terminal is connected to a QKD system. In this case, the key management terminal and the QKD system are independent from each other. It should be noted that, the key management terminal may be integrated in the QKD system, which is not limited in the present embodiment. The method includes steps S101 to S103.

In step S101, the QKD system on the terminal side and a QKD system on at least one cloud server side generate at least one quantum key over a quantum network.

After determining specific cloud server side(s) with which to generate the quantum key, the terminal side generates, over the quantum network, a quantum key through the QKD system of the terminal side and the QKD system(s) of the specific cloud server side(s).

At present, the quantum key distribution technology has been applied to build a large-scale quantum network. For example, quantum key distribution among multiple quantum key transceivers (QKD system) may be achieved through a quantum centralized control station, an optical switch and a quantum communication server. In this embodiment, the quantum key may be generated through the above-mentioned quantum network, or through quantum networks in other forms, which is not limited in this embodiment.

In step S102, the QKD system on the terminal side sends the at least one quantum key to the key management terminal for storage.

It should be noted that, after generating, over the quantum network, the at least one quantum key through the QKD system on the terminal side and the QKD system on at least one cloud server side, the terminal side needs to store the at least one quantum key in the key management terminal on the terminal side.

In step S103, the cloud storage client obtains the at least one quantum key from the key management terminal, and processes the at least one quantum key to generate a combined key by a predetermined encryption algorithm.

The predetermined encryption algorithm may include a variety of existing encryption algorithms, such as XOR, and addition, which is not limited in this embodiment.

In the cloud storage method according to the present embodiment, at least one quantum key is generated, over a quantum network, through a QKD system on the terminal side and a QKD system on at least one cloud server side. The cloud storage client processes the at least one quantum key to generate a combined key by the predetermined encryption algorithm. With the above-mentioned method, the quantum key distribution technology and cloud storage technology are combined. By taking advantage of the distributed characteristic of the cloud storage and the natural advantage that a large amount of random number keys can be easily generated by the quantum key distribution technology and are difficult to be intercepted, a malicious attacker cannot obtain the quantum key and thus cannot crack the combined key, which significantly ensures data security of the cloud storage.

Second Embodiment

Figure 2:
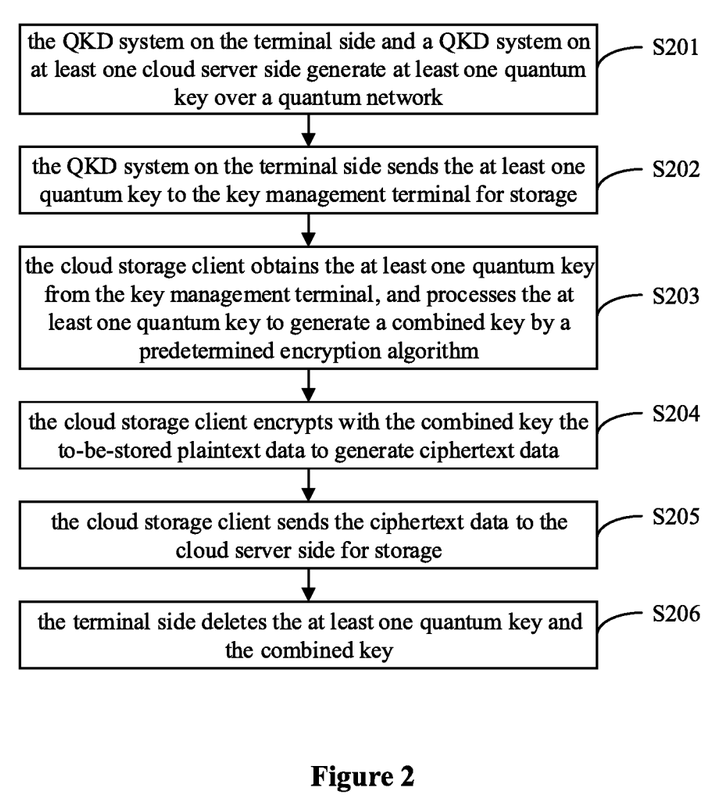
FIG. 2 is a flowchart of a cloud storage method according to a second embodiment of the present disclosure.

Referring to FIG. 2, a flowchart of a cloud storage method according to a second embodiment of the present disclosure is shown. The method is applied to a terminal side of a cloud storage system, the terminal side includes a cloud storage client, a key management terminal and a QKD system. The cloud storage client may be a mobile phone, a computer or other dedicated cloud storage clients, etc. The cloud storage client is connected to a key management terminal, and the key management terminal is connected to a QKD system. In this case, the key management terminal and the QKD system are independent from each other. It should be noted that, the key management terminal may be integrated in the QKD system alternatively, which is not limited in the present embodiment. The method includes steps S201 to S206.

In step S201, the QKD system on the terminal side and a QKD system on at least one cloud server side generate at least one quantum key over a quantum network.

In step S202, the QKD system on the terminal side sends the at least one quantum key to the key management terminal for storage.

In step S203, the cloud storage client obtains the at least one quantum key from the key management terminal, and processes the at least one quantum key to generate a combined key by a predetermined encryption algorithm.

It should be noted that steps S201 to S203 according to this embodiment are similar to steps S101 to S103 according to the first embodiment, which are not repeated herein. For details, one may refer to the related description in the first embodiment.

In step S204, the cloud storage client encrypts, with the combined key, the to-be-stored plaintext data, to generate ciphertext data.

In step S205, the cloud storage client sends the ciphertext data to the cloud server side for storage.

In step S206, the terminal side deletes the at least one quantum key and the combined key.

It should be noted that, after sending the ciphertext data to the cloud server side for storage, the cloud storage client instructs or controls a relevant component on the corresponding terminal side to delete the at least one quantum key and the combined key, so as to release the resources on the terminal side.

According to the present embodiment, the disclosed cloud storage method includes generating a combined key with a quantum key, encrypting data with the combined key for cloud storage, and deleting the at least one quantum key and the combined key stored on the terminal side after encrypting the data with the combined key and storing the encrypted data in the cloud. The resources on the terminal side originally used for managing the key can be released for other usage, and the resource utilization on the terminal side can be improved.

Third Embodiment

Figure 3:
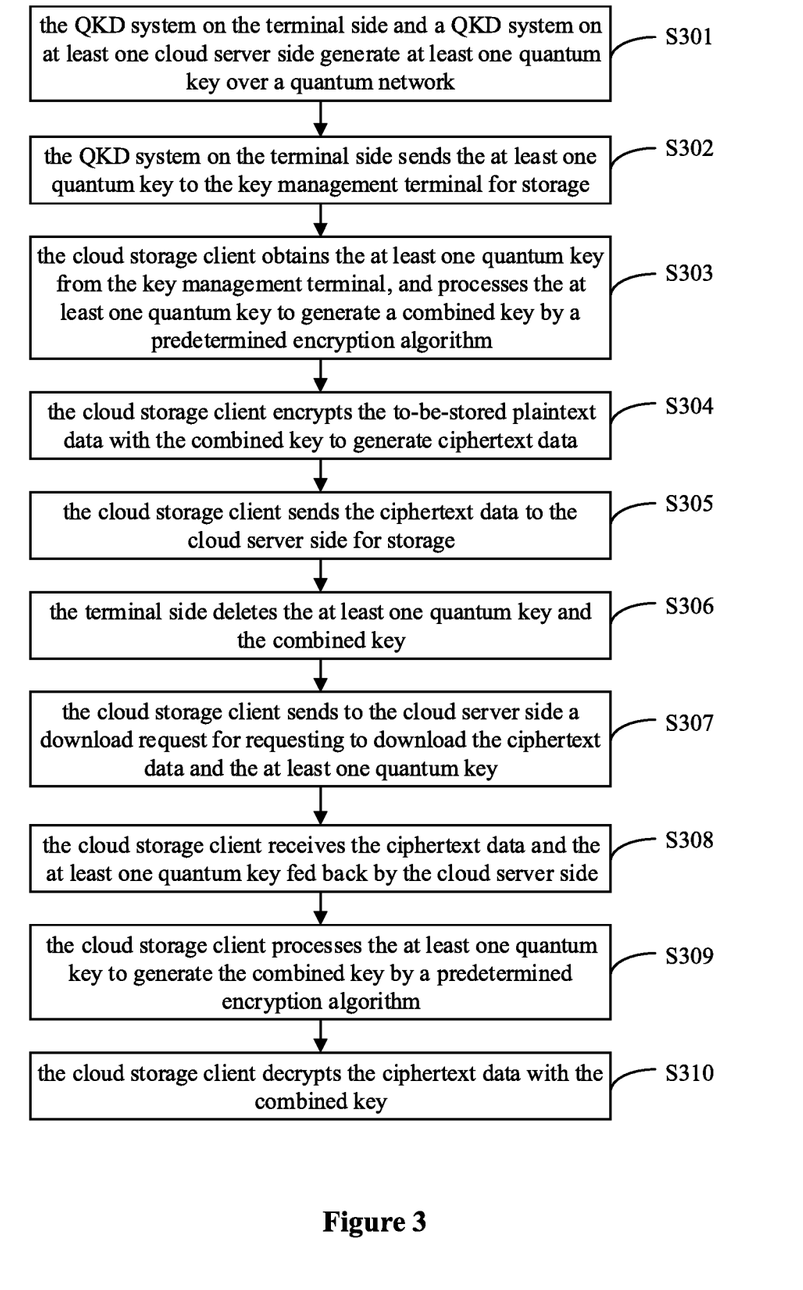
FIG. 3 is a flowchart of a cloud storage method according to a third embodiment of the present disclosure.

Referring to FIG. 3, a flowchart of a cloud storage method according to a third embodiment of the present disclosure is shown. The method is applied to a terminal side of a cloud storage system, the terminal side includes a cloud storage client, a key management terminal and a QKD system. The cloud storage client may be a mobile phone, a computer or other dedicated cloud storage clients, etc. The cloud storage client is connected to a key management terminal, and the key management terminal is connected to a QKD system. In this case, the key management terminal and the QKD system are independent from each other. It should be noted that, the key management terminal may be integrated in the QKD system, which is not limited in the present embodiment. The method includes steps S301 to S310.

In step S301, the QKD system on the terminal side and a QKD system on at least one cloud server side generate at least one quantum key over a quantum network.

In step S302, the QKD system on the terminal side sends the at least one quantum key to the key management terminal for storage.

In step S303, the cloud storage client obtains the at least one quantum key from the key management terminal, and processes the at least one quantum key to generate a combined key by a predetermined encryption algorithm.

In step S304, the cloud storage client encrypts the to-be-stored plaintext data with the combined key, to generate ciphertext data.

Optionally, the cloud storage client may pre-add a data tag for the to-be-stored plaintext data, where the data tag includes information indicating an attribute of the to-be-stored plaintext data, such as a file name, which is not limited in the embodiment. Further, the cloud storage client sends the data tag to the at least one cloud server side, such that the at least one cloud server side uses the data tag to identify the at least one quantum key.

In step S305, the cloud storage client sends the ciphertext data to the cloud server side for storage.

In step S306, the terminal side deletes the at least one quantum key and the combined key.

It should be noted that, the steps S301 to S306 according to this embodiment are similar to the steps S201 to S206 according to the second embodiment, which are not repeated herein. For details, reference is made to the relevant description in the second embodiment.

In step S307, the cloud storage client sends to the cloud server side a download request for requesting to download the ciphertext data and the at least one quantum key.

Optionally, if the cloud storage client does not know which cloud server side stores the at least one quantum key, the cloud storage client may send the data tag to all the cloud server sides. If a cloud server side received the data tag previously, the cloud server side feeds back the quantum key identified by the data tag to the terminal side.

In step S308, the cloud storage client receives the ciphertext data and the at least one quantum key fed back by the cloud server side.

It should be noted that, after receiving the download request for requesting to download the ciphertext data and the at least one quantum key, the cloud server side feeds back the ciphertext data and the at least one quantum key to the terminal side, and the at least one quantum key is encrypted by the cloud server side using a quantum key shared with the terminal side other than the at least one quantum key. That is, the terminal side downloads the at least one quantum key stored on any cloud server side through the QKD secure channel, which means even if a malicious attacker monitors all the data channels, the key information cannot be obtained, and thus the plaintext data cannot be obtained.

It should be further noted that, the at least one quantum key does not include the quantum key shared between the cloud server side and the terminal side other than the at least one quantum key. The at least one quantum key is used to generate the combined key and encrypt the to-be-stored plaintext data, and the other quantum keys shared between the cloud server side and the terminal side other than the at least one quantum key are used to encrypt the at least one quantum key when the at least one quantum key is downloaded by the terminal side. The quantum key shared between the cloud server side and the terminal side other than the at least one quantum key may be generated at the same time as the at least one quantum key, or may be generated when the terminal side downloads the at least one quantum key, which is not limited in the embodiment.

In step S309, the cloud storage client processes the at least one quantum key to generate the combined key by a predetermined encryption algorithm.

In step S310, the cloud storage client decrypts the ciphertext data with the combined key.

It should be noted that, after decrypting the ciphertext data, the cloud storage client may notify the cloud server side to delete the at least one quantum key and the ciphertext data.

In the present embodiment, the disclosed cloud storage method includes generating a combined key through a quantum key, encrypting data with the combined key for cloud storage, and accessing the cloud. Compared to the foregoing two embodiments, this method is more comprehensive. After encrypting the data with the combined key and storing the encrypted data in the cloud, the at least one quantum key and the combined key stored on the terminal side are deleted, such that the resources on the terminal side originally used to manage the key can be released for other usage, thereby improving the resource utilization on the terminal side. In cloud reading, the at least one quantum key is read directly from the cloud server side. During the process of reading, the quantum key shared between the cloud server side and the terminal side other than the at least one quantum key is used for encrypted transmission, to ensure that the at least one quantum key is not easily monitored in the transmission and thus ensure a high security for the key.

Fourth Embodiment

Figure 4:
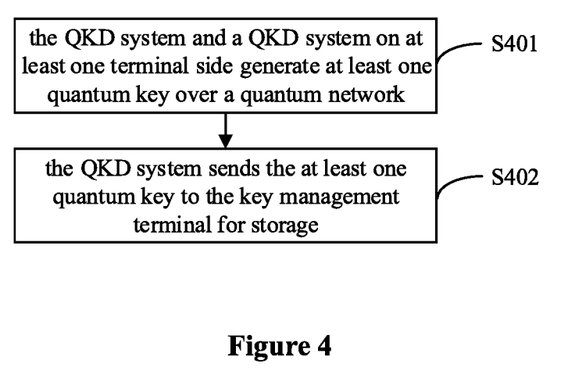
FIG. 4 is a flowchart of a cloud storage method according to a fourth embodiment of the present disclosure.

Referring to FIG. 4, a flowchart of a cloud storage method according to a fourth embodiment of the present disclosure is shown. The method is applied to a cloud server side of a cloud storage system, the cloud server side includes a cloud storage server. The cloud storage server is connected to a key management terminal, and the key management terminal is connected to a QKD system. The method includes steps S401 to S402.

In step S401, the QKD system and a QKD system on at least one terminal side generate at least one quantum key over a quantum network.

In step S402, the QKD system sends the at least one quantum key to the key management terminal for storage.

It should be noted that, in a case that the terminal side needs to obtain plaintext data, the terminal side accesses the at least one quantum key from the key management terminal on the cloud server side to decrypt the ciphertext data.

The cloud storage server stores ciphertext data after receiving the ciphertext data sent from the terminal side.

After receiving a download request sent from the terminal side for requesting to download the ciphertext data and the at least one quantum key, the cloud storage server feeds back the ciphertext data and the at least one quantum key to the terminal side, where the at least one quantum key is encrypted and transmitted through a quantum key shared between the cloud server side and the terminal side other than the at least one quantum key.

Fifth Embodiment

Figure 5:
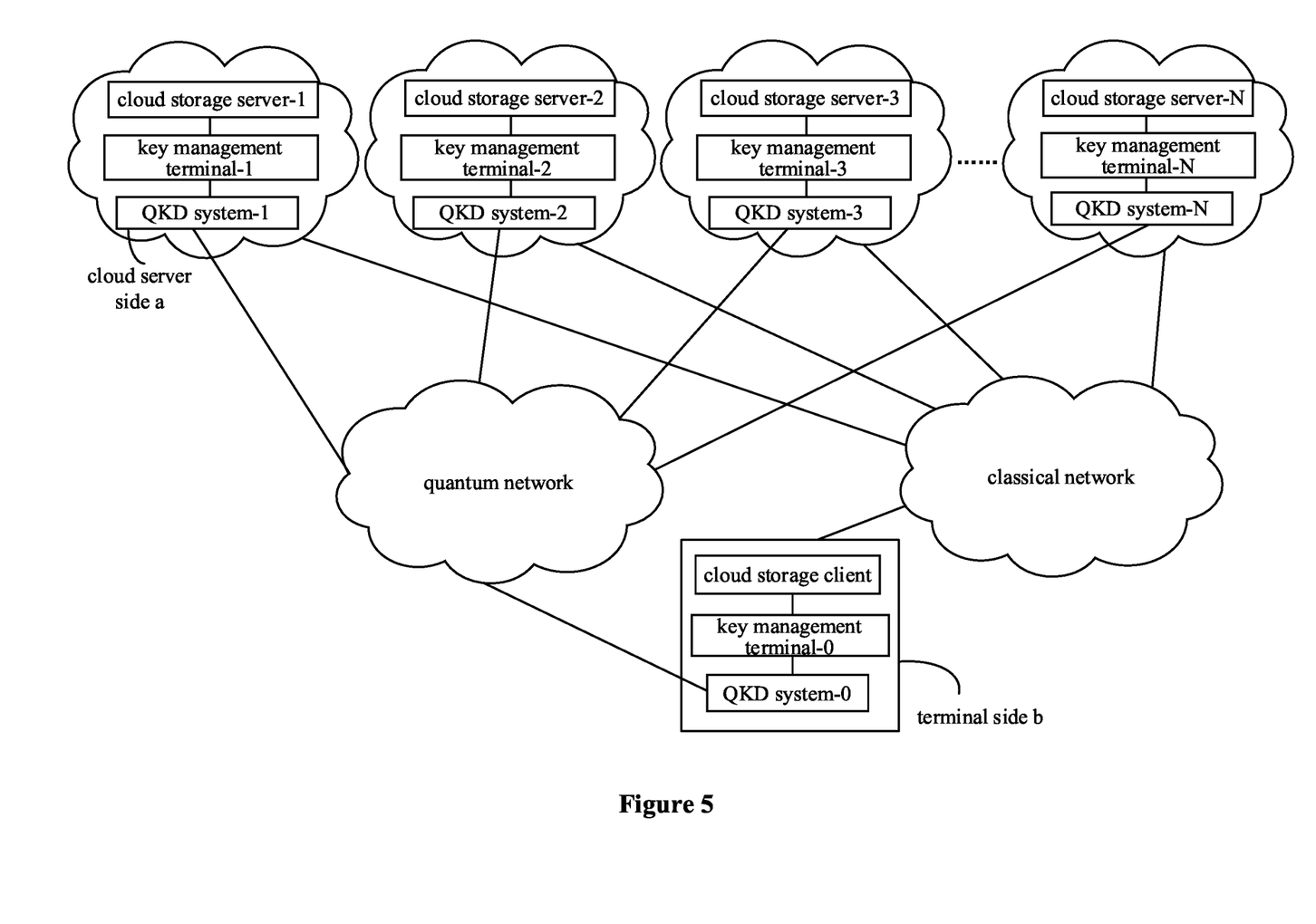
FIG. 5 is a structural diagram of a cloud storage system according to a fifth embodiment of the present disclosure.

Referring to FIG. 5, a structural diagram of a cloud storage system according to a fifth embodiment of the present disclosure is shown. The cloud storage system includes: at least one cloud server side a and at least one terminal side b connected via a quantum network and a classical network.

It should be noted that the terminal side b can perform the cloud storage method according to any one of the first to third embodiments, the cloud server side a can perform the cloud storage method according to the fourth embodiment.

Each cloud server side a includes a cloud storage server, a key management terminal and a QKD system. Each terminal side b includes a cloud storage client, a key management terminal and a QKD system. Specifically, in FIG. 5, there are N cloud server sides a and one terminal side b. A first cloud server side a includes a cloud storage server-1, a key management terminal-1 and a QKD system-1, a second cloud server side a includes a cloud storage server-2, a key management terminal-2 and a QKD system-2, a third cloud server side a includes a cloud storage server-3, a key management terminal-3 and a QKD system-3, . . . , a N-th cloud server side a includes a cloud storage server-N, a key management terminal-N and a QKD system-N. The terminal side b includes a cloud storage client, a key management terminal-0 and a QKD system-O.

It should be noted that, in a case that the above-mentioned system is used for the cloud storage service, the QKD system (such as the QKD system-0 in FIG. 5) of one terminal side b and the QKD system of the at least one cloud server side a (such as one or more of the first to N-th cloud server sides a) generate a quantum key over the quantum network, and the quantum key is stored in the key management terminal connected to the QKD system on one terminal side and is also stored in at least one key management terminal connected to the QKD system on the at least one cloud server side. The quantum key is for generating a combined key based on a predetermined encryption algorithm, so as to encrypt to-be-stored plaintext data to generate ciphertext data, The quantum key and the ciphertext data are transmitted through the classical network.

In the example that the QKD system-0 and the QKD system-1 in FIG. 5 generate the quantum key via the quantum network, the generated quantum key is stored in both the key management terminal-0 and the key management terminal-1.

It should be further noted that, the QKD technology is based on "Heisenberg Uncertainty Principle" and "Quantum Non-duplicated Principle", in which a random number is transmitted through one single photon bit, and thus the transmitter and the receiver may generate and share a random number key. In principle, any eavesdropping on the QKD process will be discovered. In the case of commonly used photon quantum communication scheme, quantum information is carried in a quantum state of single photon. A single photon is the smallest unit for light energy change, and is the most basic unit to form the light, which cannot be further divided. Therefore, the eavesdropper cannot intercept the information through dividing the photon. The "Quantum Non-duplicated Principle" determines that the state of unknown single photon cannot be accurately replicated, thus the eavesdropper cannot eavesdrop on the information through intercepting and duplicating the state of the photon. The "Heisenberg Uncertainty Principle" determines that the measurement of the state of unknown single photon is bound to disturb the state of unknown single photon, and the communicator may discover the eavesdropping accordingly. Thus, the quantum key generated by the QKD system (such as the QKD system-0 in FIG. 5) of a terminal side b and the QKD system of at least one cloud server side a (such as one or more of the first to N-th cloud server sides a in FIG. 5) via the quantum network has unconditional security.

The present embodiment provides a cloud storage system. The system includes at least one cloud server side and at least one terminal side connected via a quantum network and a classical network. Each cloud server side includes a cloud storage server, a key management Terminal and a QKD system. Each terminal side includes a cloud storage client, a key management terminal and a QKD system. The QKD system on one terminal side and the QKD system on at least one cloud server side generate a quantum key via the quantum network. The quantum key is used to generate a combined key based on a predetermined encryption algorithm, so as to encrypt to-be-stored plaintext data to generate ciphertext data. In the above-mentioned system, the quantum key distribution technology and cloud storage technology are combined. By taking advantage of the distributed characteristic of the cloud storage and the natural advantage that a large amount of random number keys can be easily generated by the quantum key distribution technology, the data security of the cloud storage is ensured significantly.

The cloud storage method and cloud storage system disclosed in the disclosure make full use of the resource advantages on the cloud server side. The encryption key is distributed and stored on the cloud server sides. The terminal side does not need to store the corresponding key information. The cloud server sides are randomly scattered throughout the country and even around the world. Malicious attackers intending to steal information do not have such ability to find the cloud server sides. Even if they find the cloud server sides, they do not have such a right to request each cloud server side to provide the information. In addition, the plaintext data are encrypted with multiple encryption keys combined, and each encryption key is independently distributed between the terminal side and different cloud server sides based on the QKD technology. Each encryption key has unconditional security. Therefore, the ciphertext data may also have high security up to unconditional security. Further, the terminal side downloads the encryption key stored on the cloud server sides through the QKD secure channel, such that even if the malicious attacker monitors all the data channels, the key information cannot be obtained, and thus the plaintext data cannot be obtained.

The embodiments of the present specification are described in a progressive manner, each of which is focused on the differences from other embodiments, and for the same and similar parts between the embodiments, one may refer to other embodiments. Since the device according to the embodiments corresponds to the method according to the embodiments, the description for the device is relatively simple, and for the relevant parts, one may refer to the method section.

It should be further noted that, the device embodiment described above is merely illustrative, the units described as the separate units may or may not be physically separate, and the components shown as units may or may not be physical units, and may be located in one place or may be distributed on multiple network elements. Parts of or all of the modules may be chosen as required to achieve the object of the embodiment. In addition, in the drawings according to the device embodiments of the present disclosure, the connection relation between the modules indicates that there is a communication connection therebetween, and may be embodied as one or more communication buses or signal lines. One of ordinary skill in the art will understand and practice without any creative work.

With the description of the above embodiments, it will be apparent to those skilled in the art that the present disclosure can be realized by combination of software and necessary general hardware, or may of course be implemented by dedicated hardware including application specific integrated circuits, dedicated CPUs, dedicated memories, and special components. In general, the functions done by computer programs may be easily implemented by corresponding hardware, and the specific hardware structure to implement the same function can be varied, such as analog circuits, digital circuits, or special circuit and so on. However, the software program implementation is better for the present disclosure in most cases. Based on this understanding, the essential part of the technical solution of the present disclosure or the part which contributes to the conventional technology, may be embodied in the form of a software product stored in a readable storage medium such as a floppy disk of a computer, a USB disk, a mobile hard disk, a read-only memory (ROM, Read-Only Memory), a random access memory (RAM, Random Access Memory), a magnetic disk, or an optical disk. The software product includes multiple instructions to allow a computer (such as a personal computer, a server, or a network device) to perform the methods according to the embodiments of the present disclosure.

In conclusion, the foregoing embodiments are merely illustrative of the technical solutions of the present disclosure and are not intended to be the limitation. Although the disclosure has been described in detail with reference to the above-described embodiments, it will be understood by those of ordinary skill in the art that, it is still possible to modify the technical solutions according to the above-mentioned embodiments, or to equivalently substitute some technical features thereof. The modifications or substitutions do not make the essential of the technical solution depart from the spirit and scope of the technical solutions according to the embodiments of the disclosure.

The invention claimed is:

1. A cloud storage method, applied to a terminal side of a cloud storage system, the terminal side comprising a cloud storage client, a key management terminal and a quantum key distribution (QKD) system, the method comprising:
   generating, by the QKD system and a QKD system on at least one cloud server side, at least one quantum key over a quantum network;
   sending, by the QKD system on the terminal side, the at least one quantum key to the key management terminal for storage;
   obtaining, by the cloud storage client, the at least one quantum key from the key management terminal, and processing the at least one quantum key to generate a combined key by a predetermined encryption algorithm;
   encrypting, by the cloud storage client, to-be-stored plaintext data with the combined key, to generate ciphertext data;
   sending, by the cloud storage client, the ciphertext data to the cloud server side for storage;
   deleting, by the terminal side, the at least one quantum key and the combined key;
   sending, by the cloud storage client, to the cloud server side a download request for requesting to download the ciphertext data and the at least one quantum key;
   receiving, by the cloud storage client, the ciphertext data and the at least one quantum key fed back by the cloud server side;
   processing, by the cloud storage client, the at least one quantum key by the predetermined encryption algorithm, to generate the combined key; and
   decrypting, by the cloud storage client, the ciphertext data with the combined key.

2. The cloud storage method according to claim 1, further comprising:
   informing, by the cloud storage client, the cloud server side to delete the at least one quantum key and the ciphertext data.

3. The cloud storage method according to claim 2, wherein before the encrypting, by the cloud storage client, to-be-stored plaintext data with the combined key, to generate ciphertext data, the method further comprises:
   pre-adding, by the cloud storage client, a data tag for the to-be-stored plaintext data; and
   sending, by the cloud storage client, the data tag to the at least one cloud server side, wherein the at least one cloud server side uses the data tag to identify the at least one quantum key.

4. The cloud storage method according to claim 1, wherein before the encrypting, by the cloud storage client, to-be-stored plaintext data with the combined key, to generate ciphertext data, the method further comprises:
   pre-adding, by the cloud storage client, a data tag for the to-be-stored plaintext data; and
   sending, by the cloud storage client, the data tag to the at least one cloud server side, wherein the at least one cloud server side uses the data tag to identify the at least one quantum key.

5. The cloud storage method according to claim 4, wherein the downloading, by the cloud storage client, the at least one quantum key from the cloud server side, comprises:
   sending, by the cloud storage client, the data tag to all cloud server sides; and
   receiving, by the cloud storage client, the at least one quantum key sent from the cloud server side which uses the data tag to identify the quantum key.

6. A cloud storage method, applied to a cloud server side of a cloud storage system, the cloud server side comprising a cloud storage server which is connected to a key management terminal connected to a quantum key distribution (QKD) system, the method comprising:
   generating, by the QKD system and a QKD system on at least one terminal side, at least one quantum key over a quantum network;
   sending, by the QKD system on the cloud server side, the at least one quantum key to the key management terminal for storage;
   storing, by the cloud storage server, ciphertext data sent from the terminal side, after receiving the ciphertext data; and
   feeding back, by the cloud storage server, the ciphertext data and the at least one quantum key to the terminal side, after receiving a download request sent from the terminal side for requesting to download the ciphertext data and the at least one quantum key,
   wherein the ciphertext data sent from the terminal side is obtained by encrypting plaintext data with a combined key, the combined key is obtained by processing the at least one quantum key by a predetermined encryption algorithm, the at least one quantum key, that is fed back to the terminal side after receiving the download request, corresponds to the at least one quantum key processed to obtain the combined key.

7. The cloud storage method according to claim 6,
wherein the at least one quantum key, that is fed back to the terminal side after receiving the download request, is encrypted and transmitted through a quantum key shared between the cloud server side and the terminal side other than the at least one quantum key.

8. A cloud storage system, comprising:
at least one terminal side and at least one cloud server side connected to each other via a quantum network and a classical network, wherein
the at least one terminal side comprises a cloud storage client, a key management terminal and a quantum key distribution (QKD) system, the cloud storage client comprises a processor and a memory, and the at least one terminal side is configured to:
  generate, by the QKD system and a QKD system on the at least one cloud server side, at least one quantum key over the quantum network;
  send, by the QKD system on the at least one terminal side, the at least one quantum key to the key management terminal for storage;
  obtain, by the cloud storage client, the at least one quantum key from the key management terminal, and process the at least one quantum key to generate a combined key by a predetermined encryption algorithm;
  encrypt, by the cloud storage client, to-be-stored plaintext data with the combined key, to generate ciphertext data;
  send, by the cloud storage client, the ciphertext data to the at least one cloud server side for storage;
  delete, by the terminal side, the at least one quantum key and the combined key;
  send, by the cloud storage client, to the at least one cloud server side a download request for requesting to download the ciphertext data and the at least one quantum key;
  receive, by the cloud storage client, the ciphertext data and the at least one quantum key fed back by the at least one cloud server side;
  process, by the cloud storage client, the at least one quantum key by the predetermined encryption algorithm, to generate the combined key; and
  decrypt, by the cloud storage client, the ciphertext data with the combined key; and
the at least one cloud server side comprises a cloud storage server which is connected to a key management terminal connected to the QKD system on the at least one cloud server side, and is configured to:
  generate, by the QKD system on the at least one cloud server side and the QKD system on the at least one terminal side, the at least one quantum key over the quantum network;
  send, by the QKD system on the at least one cloud server side, the at least one quantum key to the key management terminal on the at least one cloud server side for storage;
  store, by the cloud storage server, the ciphertext data sent from the terminal side, after receiving the ciphertext data; and
  feed back, by the cloud storage server, the ciphertext data and the at least one quantum key to the at least one terminal side, after receiving the download request sent from the at least one terminal side for requesting to download the ciphertext data and the at least one quantum key.

9. The cloud storage system according to claim 8, wherein the at least one terminal side is further configured to:
  inform, by the cloud storage client, the cloud server side to delete the at least one quantum key and the ciphertext data.

10. The cloud storage system according to claim 9, wherein before the encrypting, by the cloud storage client, to-be-stored plaintext data with the combined key, to generate ciphertext data, the at least one terminal side is further configured to:
  pre-add, by the cloud storage client, a data tag for the to-be-stored plaintext data; and
  send, by the cloud storage client, the data tag to the at least one cloud server side, wherein the at least one cloud server side uses the data tag to identify the at least one quantum key.

11. The cloud storage system according to claim 8, wherein before the encrypting, by the cloud storage client, to-be-stored plaintext data with the combined key, to generate ciphertext data, the at least one terminal side is further configured to:
  pre-add, by the cloud storage client, a data tag for the to-be-stored plaintext data; and
  send, by the cloud storage client, the data tag to the at least one cloud server side, wherein the at least one cloud server side uses the data tag to identify the at least one quantum key.

12. The cloud storage system according to claim 11, wherein, to download the at least one quantum key from the cloud server side, the cloud storage client is configured to:
  send the data tag to all cloud server sides; and
  receive the at least one quantum key sent from the cloud server side which uses the data tag to identify the quantum key.

13. The cloud storage system according to claim 8,
wherein the at least one quantum key, that is fed back to the at least one terminal side after receiving the download request, is encrypted and transmitted through a quantum key shared between the cloud server side and the terminal side other than the at least one quantum key.

* * * * *